United States Patent [19]

Steel

[11] Patent Number: 4,462,479

[45] Date of Patent: Jul. 31, 1984

[54] OVERSPEED ENGINE CONTROL

[75] Inventor: James Steel, Newcastle Upon Tyne, England

[73] Assignee: Ogden Electronics Ltd., Yorkshire, England

[21] Appl. No.: 245,206

[22] Filed: Mar. 18, 1981

[30] Foreign Application Priority Data

Mar. 19, 1980 [GB] United Kingdom ................ 8009242
Sep. 25, 1980 [GB] United Kingdom ................ 8030902

[51] Int. Cl.³ ............................................. B60K 31/00
[52] U.S. Cl. ................................... 180/171; 123/351
[58] Field of Search .................. 180/170, 171–179; 123/349–358; 361/236, 242; 307/96–97; 340/52 R, 63

[56] References Cited

U.S. PATENT DOCUMENTS

| | | | |
|---|---|---|---|
| 2,803,743 | 8/1957 | Ballerait | 180/170 |
| 3,437,188 | 4/1969 | Long | 192/103 |
| 3,578,108 | 5/1971 | McConnell | 180/171 |
| 3,691,525 | 9/1972 | McClellan et al. | 340/62 |
| 3,882,973 | 5/1975 | Hakes | 188/181 R |
| 4,101,870 | 7/1978 | Eckman | 180/170 |
| 4,136,329 | 1/1979 | Trobert | 180/271 |
| 4,211,193 | 7/1980 | Cox | 180/179 |
| 4,250,854 | 2/1981 | Matsui | 180/179 |
| 4,273,208 | 6/1981 | Liermann | 123/352 |
| 4,294,204 | 10/1981 | Hurner | 123/358 |

Primary Examiner—Joseph F. Peters, Jr.
Assistant Examiner—Timothy Roesch
Attorney, Agent, or Firm—Cushman, Darby & Cushman

[57] ABSTRACT

Apparatus for controlling the speed of an engine of a vehicle includes a processor (26) for comparing actual speed of the engine with a reference speed and for generating output signals if the actual speed is in excess of the reference speed, the output signals controlling valves (13, 14 and 15) of an air supply system (12) to a retarder of the vehicle and being arranged to operate sequentially to control progressively magnitude of power applied to the retarder if control of the vehicle is not effected to reduce speed of the engine during sequential periods of predetermined duration.

8 Claims, 1 Drawing Figure

U.S. Patent   Jul. 31, 1984   4,462,479
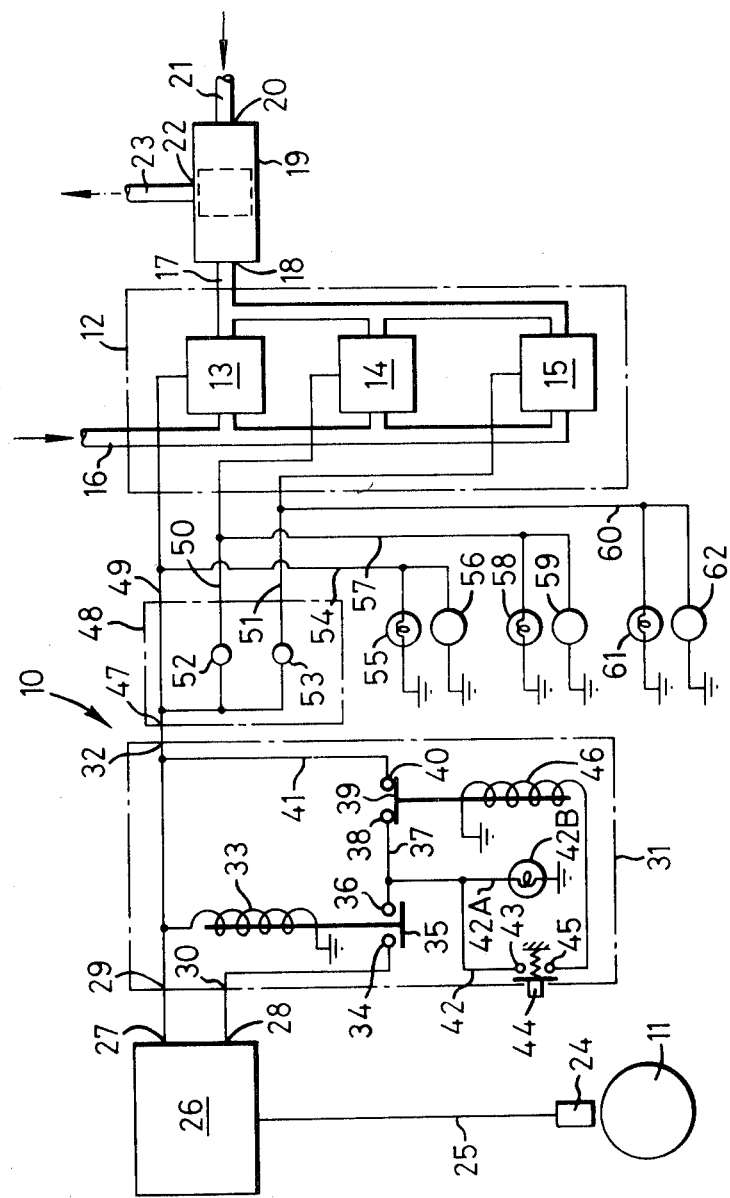

OVERSPEED ENGINE CONTROL

DESCRIPTION

This invention relates to internal combustion engine motor vehicles and, more particularly, to apparatus for controlling speed of an engine of such a vehicle.

This application is related to my co-pending commonly assigned application Ser. No. 245,205 also filed Mar. 18, 1981.

It is known that damage is likely to occur in an internal combustion engine if the speed of the engine is increased beyond a predetermined level. For this reason it is often the practice to include a revolution counter in an instrument panel of a motor vehicle and to provide the counter with markings which indicate when the speed of an engine of the vehicle has exceeded a predetermined level.

With heavy vehicles, such as large dump trucks used in the mining and construction industries for transporting loads of up to, for example, 85 tons, it is often difficult to maintain engine speed below a predetermined level when the vehicles move downwardly of an inclined path. Unless a vehicle is retarded regularly and cautiously, the velocity of the vehicle will increase progressively as the vehicle descends thereby causing the speed of the engine of the vehicle to increase beyond a predetermined level and to continue to operate beyond that level.

It is desirable, therefore, to provide apparatus for automatically controlling speed of an engine of a motor vehicle so that, if the speed exceeds a predetermined level, the speed is retarded to a level beyond the predetermined level.

According to the present invention, there is provided apparatus for controlling speed of an engine of a vehicle comprising means for generating first signals indicative of speed of the engine, means for comparing said first signals with a reference speed and for generating second signals when the engine speed exceeds the reference speed and control means responsive to said second signals to control retarding means of the vehicle so that, when the engine speed exceeds the reference speed, the engine speed is retarded to a level below the reference speed.

The control means may include a plurality of devices sequentially operable to control progressively magnitude of power applied to the retarding means.

Sequential operation of said devices may be controlled in accordance with length of a period during which the engine speed exceeds the reference speed.

Sequential operation of said devices may be controlled by timing means.

The timing means may comprise a plurality of timing devices.

The apparatus may be provided with a plurality of indicating devices each associated with a corresponding one of said timing devices and each adapted to be activated on activation of a corresponding timing device.

Each of said indicating devices may comprise apparatus for providing visual and audible signals.

The control means may be controlled to release the retarding means on operation of reset means.

The reset means may be a switch included in the control means.

The reset switch is operable by manual control.

In this specification the expression 'manual control' means control by human intervention and may include operation by a human limb, such as a hand or a foot.

Following is a description by way of example only and with reference to the accompanying drawing, which is a diagrammatic representation, of one method of carrying the invention into effect.

In the drawing, there is shown apparatus 10 for controlling speed of an engine (not shown) of a vehicle (not shown). The engine is provided with a flywheel 11 and a pneumatic breaking system, a portion of which is shown at 12, which comprises three electrically operated valves 13, 14 and 15 each of which is connected to a common air supply through a conduit 16. An output of each of the valves 13, 14 and 15 is connected to a common feed conduit 17 which is connected to an input 18 of a slide valve 19. A second input 20 of the slide valve 19 has connected thereto a conduit 21. An outlet 22 of the slide valve 19 has connected thereto a conduit 23 for supplying a retarder (not shown) of the vehicle.

The arrangement is such that, if none of the valves 13, 14 and 15 is operated air supply can only be directed through the conduit 21 to the slide valve 19 and through the slide valve and the conduit 23 to the retarder to retard the vehicle. The pressure of air directed to the conduit 21 is controlled by operation of a lever (not shown) on a control column (not shown) of the vehicle.

The valve 13 is arranged such that, when operated, air supplied thereto is permitted to pass therethrough onward to the conduit 17 and to the slide valve 19, operating the slide valve and subsequently passing through the conduit 23 to the retarder. Similarly, the valve 14 and 15, when operated, also permit air supplied thereto to pass therethrough to the conduit 17 and the slide valve 19 and onward through the conduit 23 to the retarder. The valves 13, 14 and 15 are controlled, in a manner to be described hereinafter, to operate consecutively and the arrangement is such that, when the valve 13 is operated, only 30% of the pressure of the air supplied to the conduit 16 passes to the conduit 17 but, when the valve 14 is operated while the valve 13 continues to be operated, 60% of the pressure of the air supplied to the conduit 16 passes to the conduit 17 and, when the valve 15 is operated while the valves 13 and 14 continue to be operated, 90% of the pressure of the air supplied to the conduit 16 is passed to the conduit 17.

Operation of the valves 13, 14 and 15 is controlled by an electrical circuit which includes a transducer 24 connected to a processor 26 by means of a line 25. The processor 26 is provided with a counter for counting pulses received from the transducer 24. The flywheel 11 is provided with a mark (not shown) which moves relative to the transducer 24 on rotation of the flywheel 11 so that a pulse is transmitted from the transducer 24 through the line 25 to the counter of the processor 26 for each revolution of the flywheel 11. In this manner, the processor 26 is adapted to record the engine speed of the vehicle. The processor 26 also is adapted to compare the engine speed of the vehicle derived from pulses received along the line 25 with a predetermined speed, for example 2400 rpm, being a desired maximum speed of the engine. The processor 26 is provided with two output lines 27, 28 arranged such that, when the speed of the vehicle is equal to or exceeds 2400 rpm, a signal is transmitted along the line 27 and if, the speed of the vehicle thereafter falls to 2350 rpm or below, a signal is also transmitted along the line 28. The lines 27, 28 are connected to input lines 29, 30 respectively of a latch and cancel unit 31. The input line 29 is connected to an output line 32 and is tapped by one end of a coil of a solenoid 33, the other end of which is earthed. The input line 28 is connected to a terminal 34 of a switch contact 35, the other terminal 36 of which is connected by a line 37 to a terminal 38 of another switch contact 39. The other terminal 40 of the switch contact 39 is connected by a line 41 to the output line 32.

The latch and cancel unit 31 also includes a line 42 tapped from the line 37 and connected to a terminal 43 of a "cancel" switch 44, the other terminal 45 of the switch 44 having connected thereto one end of a coil of a solenoid 46, the other end of the coil being earthed. The line 42 is tapped by a line 42A connected to a buzzer 42B.

The switch contact 35 is operated by the solenoid 33 and is normally open and the switch contact 39 is operated by the solenoid 46 and is normally closed.

The output line 32 of the latch and cancel unit 31 is connected to an input line 47 of a timing unit 48. The timing unit 48 has three output lines 49, 50 and 51. The output line 49 is a continuation of the input line 47. The output line 50 is tapped from the input line 47 and includes a timer 52 for delaying transmission of signals received from the input 47 for five seconds until transmitting the signals along the line 50. The output line 51 is tapped from the input line 47 and includes a timer 53 for delaying transmission of signals received from the input line 47 for thirteen seconds until transmitting the signals along the output line 51.

The output line 49 is connected to a terminal of the valve 13. The output line 50 is connected to a terminal of the valve 14 and the output line 51 is connected to a terminal of the valve 15.

The output line 49 is tapped by a line 54 connected to a warning lamp 55 and a buzzer 56 in parallel. The output line 50 is tapped by a line 57 which is connected to a warning lamp 58 and a buzzer 59 in parallel and the output line 51 is tapped by a line 60 connected to a warning lamp 61 and a buzzer 62 in parallel.

In operation, the processor 26 compares signals received from the transducer 24 representative of speed of the engine of the vehicle and compares the signals with signals representative of a predetermined desired manimum engine speed, such as 2400 rpm. If the speed of the engine is equal to or greater than 2400 rpm, a voltage is supplied to output line 27 of the processor 26. In consequence, a voltage is transmitted along the input line 29 and the output line 32 of the latch and cancel unit 31, the input line 47 of the timing unit 48 and the output line 49 of the timing unit to the terminal of the valve 13. The valve 13 consequently is operated and air at 30% of the pressure supplied to the conduit 16 is passed through the conduit 17, the slide valve 19 and the conduit 23 to the retarder thereby effecting retardation of the vehicle. Simultaneously with operation of the valve 13 a voltage is directed along the line 54 causing the warning lamp 55 to illuminate and the buzzer 56 to sound. If the driver of the vehicle does not thereafter control the vehicle to reduce the engine speed after five seconds, a voltage is directed along the line 50 to the valve 14 causing the valve to operate and the presssure of air directed to the retarder through the conduits 17 and 23 to increase from 30% to 60% of the pressure of the air supplied to the conduit 16. A voltage also is directed along the line 57 with a result that the warning lamp 58 is illuminated and the buzzer 59 sounded. After a further thirteen seconds and assumming that no reduction of speed of the engine below 2400 rpm is effected, a voltage is applied along the line 51 to the valve 15 thereby operating the valve and increasing the pressure of the air supply to the retarder from 60% to 90% of the pressure air supplied to the conduit 16 whilst simultaneously causing a voltage to be applied along the line 60 with a result that the warning lamp 61 is illuminated and the buzzer 62 is sounded.

The effect of 90% of full pressure of air directed to the retarder effects retardation of the vehicle to a speed of 2350 rpm or below with a result that the voltage applied to the output line 27 of the processor 26 is removed but a similar voltage is applied to the output line 28 of the processor 26 ensuring that the solenoid 33 remains energised and the switch contact 35 remains closed. The valves 13, 14 and 15 thus will continue to operate, the warning lamps 55, 58 and 61 will continue to be illuminated and the buzzers 56, 59 and 62 will continue to be sounded.

The apparatus is "reset" by operation of the "cancel" button 44 which connects the terminals 43 and 45 causing energisation of the solenoid 46 with a result that the switch contact 39 is opened and voltage supply to the output line 32 of the latch and cancel unit 31 is cut off. The valves 13, 14 and 15 therefore are de-activated and compressed air supply to the conduit 17 is cut off. The retarder thus is de-activated and retardation of the vehicle is discontinued by means of automatic operation of the retarder.

In this manner, if the driver of a vehicle fails to take appropriate action to prevent the engine of the vehicle exceeding a predetermined speed, the speed of the engine is automatically reduced by automatic operation of the retarder of the vehicle. The retarder continues to be automatically operated even after the speed of the engine has been automatically reduced to below a predetermined level until the driver operates the "cancel" button 44.

I claim:

1. Apparatus for controlling speed of an engine of a vehicle having brake retarding means, said apparatus comprising:

means for generating a first signal indicative of speed of the engine, means for comparing said first signal with a signal representing a reference speed and for generating a second signal when the engine speed exceeds the reference speed, and control means responsive to said second signal to control the brake retarding means of the vehicle so that, when the engine speed exceeds the reference speed, the engine speed is retarded by the brake retarding means to a level below the reference speed, wherein said control means includes a plurality of devices successively and sequentially operable in accordance with length of a time period during which the engine speed exceeds the reference speed to control progressively the magnitude of power applied to the brake retarding means, a plurality of timing means each associated with a corresponding one of said devices and each adapted to be activated on activation of a corresponding device, and a manually operable reset switch to release the brake retarding means upon operation thereof, the said reset switch being inoperable unless the engine speed is below a predetermined value.

2. Apparatus as claimed in claim 1 further comprising a plurality of indicating devices each associated with a corresponding one of said timing means and each adapted to be activated on activation of a corresponding timing means.

3. Apparatus as claimed in claim 2 wherein each said indicating devices comprises apparatus for providing visual and audible signals.

4. Engine overspeed control apparatus for use in controlling the speed of an engine used to drive a vehicle having a braking system, said apparatus comprising:
   detecting means for detecting engine speed in excess of a predetermined limit value and for producing a control signal when engine speed exceeds said limit value;
   first brake actuation means for automatically actuating said vehicle braking system to a predetermined initial degree in response to said control signal;
   timing means for measuring the elapsed time duration of said control signal and providing a further control signal if the measured time duration persists beyond a predetermined time value; and
   second brake actuation means for automatically further actuating said vehicle braking system to a further degree in response to said further control signal.

5. Engine overspeed control apparatus for use in controlling the speed of an engine used to drive a vehicle having a braking system, said apparatus comprising:
   detecting means for detecting engine speed in excess of a predetermined limit value and for producing a control signal in response to such detection;
   first brake actuation means for automatically actuating said vehicle braking system to a predetermined initial degree in response to said control signal;
   timing means for measuring the elapsed time duration of said control signal and providing a further control signal if the measured time duration persists beyond a predetermined time value;
   second brake actuation means for automatically further actuating said vehicle braking system to a further degree in response to said further control signal; and
   reset means connected to said detecting means for permitting manual deactuation of said first and second brake actuation means only after the engine speed is less than a predetermined speed.

6. Apparatus for controlling speed of an engine of a vehicle having brake retarding means, said apparatus comprising:
   means for generating a first signal indicative of speed of the engine,
   means for comparing said first signal with a signal representing a reference speed and for generating a second signal when the engine speed exceeds the reference speed, and
   control means responsive to said second signal to control the brake retarding means of the vehicle so that, when the engine speed exceeds the reference speed, the engine speed is retarded by the brake retarding means to a level below the reference speed
   wherein the control means includes reset means to release the brake retarding means upon operation thereof, said reset means being inoperable unless the engine speed is below a predetermined value.

7. Apparatus as claimed in claim 6 wherein the reset means comprises a switch included in the control means.

8. Apparatus as claimed in claim 7 wherein the reset switch is operable by manual control.

* * * * *